United States Patent [19]

Dolan et al.

[11] 4,445,128
[45] Apr. 24, 1984

[54] METHOD AND APPARATUS FOR COMPENSATING FOR IRREGULAR MOTION

[75] Inventors: Donald T. Dolan, Ridgefield; Henry Stalzer, Danbury, both of Conn.

[73] Assignee: Pitney Bowes Inc., Stamford, Conn.

[21] Appl. No.: 364,834

[22] Filed: Apr. 2, 1982

[51] Int. Cl.³ .................................... G01D 15/14
[52] U.S. Cl. ............................ 346/160; 346/107 R
[58] Field of Search ............... 346/107 R, 134, 136, 346/138, 153.1, 154, 160; 358/300

[56] References Cited

U.S. PATENT DOCUMENTS

| 3,438,057 | 4/1969 | Neitzel | 346/107 R |
| 3,609,238 | 9/1971 | Hodel | 346/153.1 X |
| 4,318,597 | 3/1982 | Kotani et al. | 346/107 R |

Primary Examiner—Thomas H. Tarcza
Attorney, Agent, or Firm—Peter Vrahotes; William D. Soltow, Jr.; Albert W. Scribner

[57] ABSTRACT

A non-impact printer in which a source of image information such as a computer, facsimile machine, word processor or the like provides image information to an image transfer device which transfers the image to a moving image receiving surface for printing of the image as hard copy. A motion encoder senses the motion of the image receiving surface and creates a digital timing signal representative of the motion. A logic circuit selectively delays the input of the image information signal to the image transfer device in response to digital timing signal to synchronize motion of the image receiving surface with transfer of the image to the image receiving surface.

7 Claims, 6 Drawing Figures

METHOD AND APPARATUS FOR COMPENSATING FOR IRREGULAR MOTION

RELATED APPLICATIONS

This application is related to U.S. application Ser. No. 162,968, filed June 25, 1980 and entitled "Light Emitting Diode Assembly" and U.S. application Ser. No. 292,985, filed Aug. 14, 1981 and entitled "Control of a Light Emitting Diode Array", each of which copending applications is assigned to the assignee of the present invention. The specific and entire disclosure of the aforementioned applications is specifically incorporated herein by reference for the purpose of further explaining the nature and operation of the present invention.

BACKGROUND OF THE INVENTION

This invention relates generally to non-impact printers and more specifically to an electrophotographic printer adapted to print copy from a source of image information.

In electrophotographic printing, a photoreceptor in the form of a photoconductive surface on a moving belt or drum is uniformly charged and exposed to a light image from a source of image information. Exposure of the photocoductive surface to a light source discharges localized portions of the surface and thereby records thereon an electrostatic latent image corresponding to the original image. The electrostatic latent image is then developed and rendered visible by depositing toner particles which adhere electrostatically thereto in an image configuration. Subsequently, the toner powder is transferred to a sheet of support material which may be plain paper or transparent plastic sheet, among other materials. The toner powder is then affixed to the support material and fused thereto so as to produce a so-called hard copy of the original image.

As a source of illumination for exposing the photoconductive surface in medium to high speed applications requiring high image quality, it is desirable to employ an array of light emitting diodes (LEDs). This permits the construction of a printer which is compact, light in weight, economical and having low maintenance while maintaining high quality printing. Such a non-impact printer employing light emitting diodes as a source of illumination can be used as peripheral equipment for the output of a computer where the array of light emitting diodes is driven by a digital signal from a character generator containing image or character information received from the computer. The source of image information for the light emitting diode array can also be from a hard copy reader such as an optical character reader, or from a high speed facsimile scanner, word processor or other image information generating device.

In such printers, the photoreceptor may be either a belt or a drum having a photoconductive surface thereon in optical registration with the light emitting diode array. Selective energization of individual groups of the light emitting diode array illuminates and discharges selected portions of the charged photoconductive surface in the image pattern of a line of print characters or other image associated with the image code signals output from the character generator or other source of image information. The selective energization of individual groups of the light emitting diode array produces an array of dot sized discharged portions of the photoconductive surface of the photoreceptor which has been charged prior to exposure to the diode array. The image created on the photoreceptor is in the form of depleted charge portions on the previously charged photoreceptor. As noted above, the latent image on the photoreceptor is developed electrophotographically by means well known in the art and not forming part of this invention.

It has been determined that a major cause of poor image quality in the printing of hard copy by such photoprinters is irregular motion by the photoreceptor. The photoreceptor is driven by an electrical or an electromechanical drive and as with any such mechanisms develops occasional jitter or other non-uniform irregular motion which, though slight, is capable of distorting or diminishing image quality of the output from the printer. It has been discovered that such poor image quality can be overcome by coordinating or synchronizing the energization of individual groups of the diode array with the motion of the photoreceptor even though the photoreceptor motion be non-uniform. In this way the dots forming the image on the photoreceptor will always be in the correct position to insure a high quality image despite irregular or non-uniform motion of the photoreceptor.

Accordingly, it is an object of this invention to provide a method and apparatus for synchronizing the energization of individual groups of the light emitting diode array with the motion of the photoreceptor to coordinate the exposure of selected localized areas of the photoconductive surface to produce a high quality latent image even though movement of the photoreceptor is irregularly non-uniform.

SUMMARY OF THE INVENTION

Briefly stated, and in accordance with one embodiment of the present invention, there is provided a printing apparatus and method for exposing a charged photoconductive surface to light emitted from individual groups of diodes of a light emitting diode array energized selectively by means of a signal containing image information.

Pursuant to one embodiment of the present invention a character generator or other source of image data selectively energizes individual groups of diodes within an array of solid state light emitting diodes (LEDs) to expose and thereby discharge selected localized areas of a previously charged photoconductive surface on a photoreceptor drum or belt to produce thereon a latent image corresponding to the image transmitted from the source of image data. A motion encoder is employed to develop a timing signal indicative of the movement of the photoreceptor and a logic circuit is employed to synchronize the selective energization of the individual diode groups with movement of the photoreceptor to produce a high resolution printed image.

BRIEF DESCRIPTION OF THE DRAWINGS

Other objects and advantages of the present invention will become apparent upon reading the following detailed description and upon reference to the drawings wherein.

While the present invention will be described in connection with a preferred embodiment thereof, it will be understood that it is not intended to limit the invention to that embodiment only. On the contrary, it is intended to cover all alternatives, modifications and equivalents as may reasonably be included within the spirit and scope of the invention as defined by the appended claims.

DETAILED DESCRIPTION OF THE INVENTION

Figure 1:
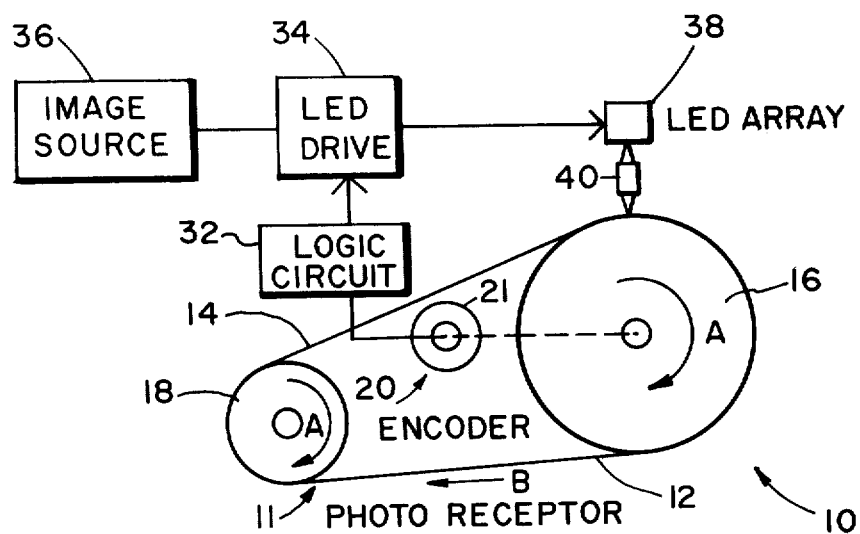
FIG. 1 is a block diagram of the essential elements of the printer according to this invention.
Figure 2:
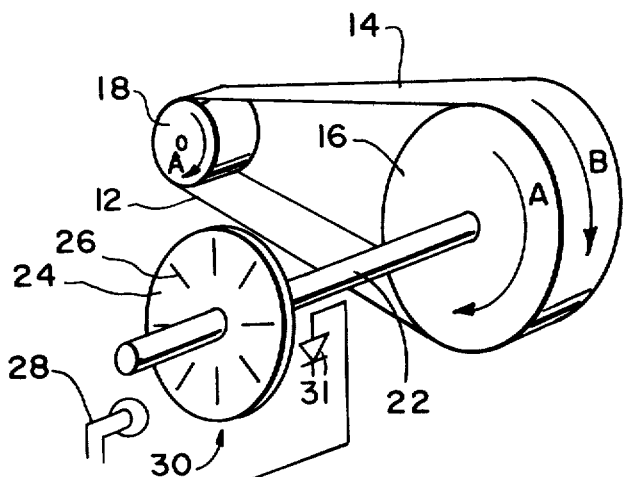
FIG. 2 is a timing and logic circuit employed in this invention together with a specific form of motion encoder.
Figure 2:
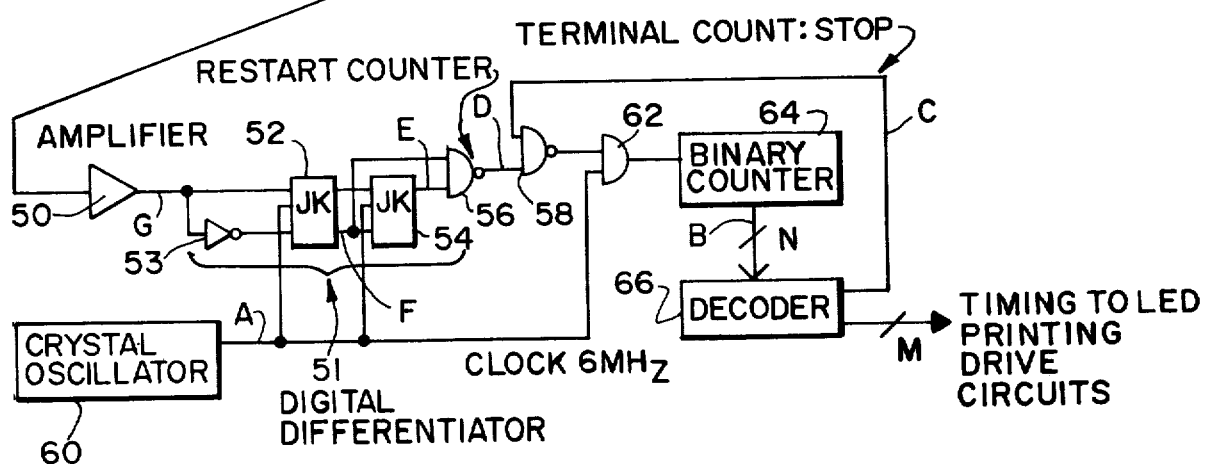

Referring now to the drawings, particularly FIGS. 1 and 2, an electrophotographic printing device 10 incorporating non-uniform motion compensation according to this invention is shown in schematic form. The electrophotographic printer adapted to employ the present invention therein comprises a photoreceptor 11 having a belt 12 with a photoconductive surface 14 on one side thereof. The belt 12 is mounted on a rotatable drive roll 16 and idler roll 18 which rotate in direction A as shown by the arcuate directional arrow. Photoconductive surface 14 is moved continuously in direction B at approximately 10 inches per second. In an alternate embodiment as is well known in the art and is not shown in the drawing, the photoreceptor 11 can be in the form of a rotating drum having a photoconductive surface 14 thereon. Motive power for the rotation of the drum or belt can be by any suitable electrical or electromechanical drive mechanism, not shown.

A motion encoder 20 is employed to monitor the motion of the photoreceptor and to produce a digital timing signal indicative of the photoreceptor motion. It will be understood that the motion encoder 20 can be any suitable device for sensing the motion of the photoreceptor 11 and generating a digital signal representative of the motion including, for example, magnetic or capacitive devices for sensing the displacement of the photoreceptor. As shown schematically in FIG. 1, the motion encoder 20 may engage the drive roll 16 to track the movement of the photoreceptor and generate a digital signal corresponding thereto which is fed through logic circuit 32 to the LED drive circuit 34. As will be explained more fully, the output of the motion encoder 20 is combined with the timing signals employed in the LED drive circuit to selectively energize individual groups of LED's contained in the diode array and selectively discharge localized areas of the photoconductive surface of the photoreceptor as is shown schematically in FIG. 1.

A motion encoder 30 is shown schematically in FIG. 2 where the drive roll 16 of the photoreceptor 11 is mounted on a shaft 22, and mounted on the same axis or shaft, is a light interruptor in the form of an opaque rotating wheel 24 having light permeable radial slots 26 therethrough. Rotation of the wheel and the drive roll are identical since both are mounted on the same axis or shaft. A light source 28 is mounted on one side of the light interruptor 24 and a photodetector 31 is mounted on the opposite side. Movement of the drive roll 16 is accompanied by identical movement of the light interruptor wheel 24 which interrupts the light rays impinging on the photodetector 31 to form a digital timing signal representative of the motion of the photoreceptor 11.

Figure 3:
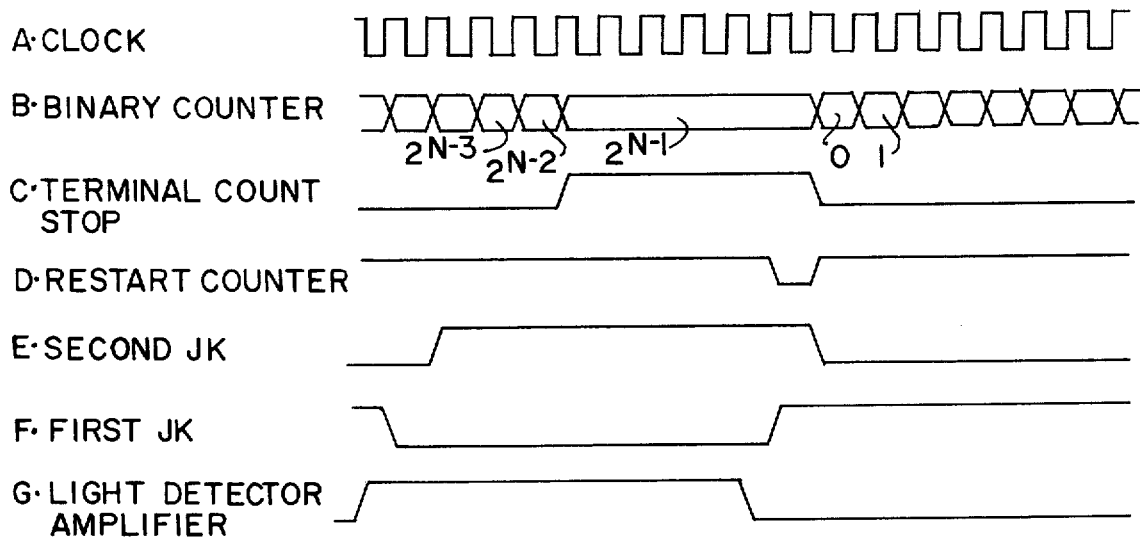
FIG. 3 is a timing diagram showing the relationship of the electrical signals at various points in the circuit.
Figure 6:
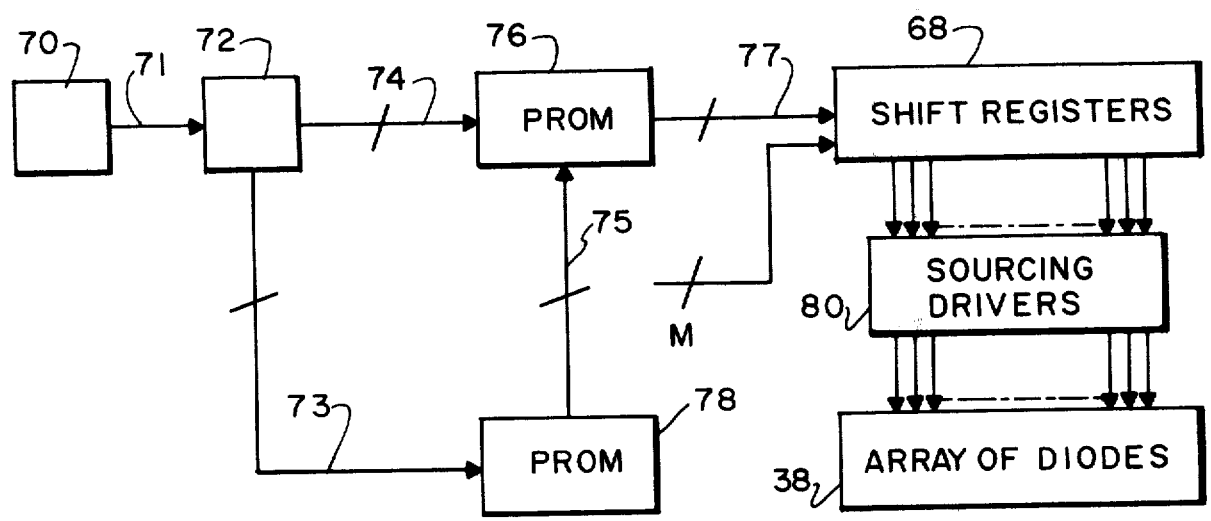
FIG. 6 is a block diagram of the circuit elements energizing the diode array and receiving the output from the circuit of FIG. 2

As shown in FIG. 1, the timing signal representing the motion of the photoreceptor 11 is directed to a logic circuit 32 and, as is discussed more fully in connection with FIGS. 2, 3 and 6, to an LED driver circuit 34 which also receives an image data signal from a source 36. The drive circuit 34 selectively energizes individual groups of diodes in LED array 38. Diode array 38 may be of the type and construction described in the above-noted copending application Ser. No. 162,968. In general, the diode array may be in an assembly approximately eight and one-half inches in length to span the width, in a direction perpendicular to the direction of travel B, of the image bearing portion of photoconductive surface 14. By way of example, if 2048 LEDs are employed, four individual groups of 32 contiguous LEDs are energized simultaneously and the light emitted therefrom is directed through a focusing assembly 40 to photoconductive surface 14 of the photoreceptor 11. Focusing assembly 40 may be a lens or fiber assembly to focus light emitted from the diode groups onto surface 14. The photoconductive surface 14 is given an electrostatic charge by a conventional assembly, not shown. Selective energization of individual LED groups discharges localized areas, preferably in the form of dots, of the photoconductive surface 14 in a pattern forming an electrostatic latent image corresponding to the image data signal received from source 36. The latent image is subsequently developed by means, not shown, in a conventional manner by the application of toner to the surface 14. Thereafter, the image is transferred to sheet paper or transparent plastic and fused as is well known in the art.

Referring now to FIGS. 2, 3 and 6, the signal representative of the motion of the photoreceptor 11 is directed to amplifier 50, the output of which is connected to a digital differentiator circuit 51. Within the digital differentiator circuit 51, the output of the amplifier 50 is connected to one input of a first J-K flipflop 52 and also through an inverted 53 to the other input of the first J-K flipflop 52. One output of the first J-K flipflop 52 is connected to one input of a second J-K flipflop 54, while the other output is connected to the other input of the second J-K flipflop 54 and also to one input of a first NAND gate 56. The output of the J-K flipflop 54 is connected to the other input of the first NAND gate 56, the output of which is connected to one input of second NAND gate 58.

A crystal oscillator 60 provides a clock signal such as a 6 MHz clock signal to each of the first and second J-K flipflops 52 and 54 and is also connected to one input of AND gate 62, the other input of which is received from the output of second NAND gate 58. The output of AND gate 62 is connected to a binary counter 64, the multiple outputs N of which are connected through a decoder 66, one set of multiple outputs M of which are the timing signals connected to shift registers 68 (FIG. 6). The remaining output from decoder 66 is labelled TERMINAL COUNT STOP and is connected to the other input to second NAND gate 58.

The source of image information 36 shown in FIG. 1 may, as shown in FIG. 6, be in the form of a host computer 70, the output of which is connected through lead 71 to a character generator 72. The host computer 70 provides the necessary intelligence or commands relative to the text or characters to be reproduced. An example of such a computer is shown for example in U.S. Pat. No. 3,737,852, but does not form a part of this invention and for this reason, details as to the functioning of the computer are not given. It will be understood that pictorial and graphic material, as well as alphanumeric characters, may form the image to be reproduced. The character generator 72, in response to information received from computer 70, determines the location and arrangement of the characters to be reproduced. Such characters are generated by a plurality of data signals, each of which will, in the embodiment shown here, produce a dot sized discharged area on photoreceptor 11. Dot producing data signals from character generator 72 are fed to a programmable read only memory 76 over data input leads 74. Dot location information is supplied by the character generator over leads 73 to a second programmable read only memory 78 which has been pre-programmed with information relating to the individual intensity characteristics of each of the light emitting diodes to be energized. The PROM 76 combines the dot producing data received from PROM 78 through leads 75 with the individual LED intensity characteristics information signals to produce signals to shift registers 68 through leads 77 for energizing array 38 so that uniform classes of dot sizes are created by combining data signals received from PROM 78 and character generator 72. Image data is supplied to and stored in shift registers 68 together with timing signals M received from the decoder 66. The timing signals M time the operation of the latch circuits within the shift registers 68, under the control of clock pulse signals from oscillator 60, to effect energization of individual groups of diodes within the light emitting diode array 38 by sourcing drivers 80. It will be understood that connections 71, 73, 74, 75 and 77 are multiple lead lines. A more complete description of the details of FIG. 6 may be found in the above noted application Ser. No. 292,985.

A description of the operation of the invention follows. Referring to FIGS. 2, 3, and 6, the photoreceptor 11 is in continuous motion in direction B, and continually presents the freshly charged photoconductive surface 14 to LED array 38, the motion of the photoreceptor 11 being monitored by a motion encoder in the form of light interrupter 30 as shown in FIG. 2. The motion encoder provides a digital signal representative of the motion of photoreceptor 11, including non-uniform or irregular motion, to amplifier 50. When the signal output from amplifier 50 (as shown in FIG. 3 at G) goes high, the output from first J-K flipflop 52 at F goes low at the next occurring rising edge of clock pulse A and the output from second J-K flipflop 54 at E goes high one clock cycle later.

Binary counter 64 is a multi-state, multi-output device, a timing diagram for the outputs N of which is shown in FIG. 3 at B. In the embodiment shown in FIG. 2, counter 64 has N binary bit outputs and $2^N$ states. Counter 64 will sequence or count from a zero state to state $2^{N-1}$, where it will stop counting or sequencing and remain in its highest state, that is state $2^{N-1}$. The sequencing of binary counter 64 is timed by the clock signal A from oscillator 60 through AND gate 62 so that the period of one binary counter state equals one complete clock cycle i.e. a high and a low as shown in FIG. 3.

When the signal at G from the light detector amplifier 50 goes low, the state change of the signal received from amplifier 50 is sensed by the digital differentiator circuit 51. This change in state of amplifier 50 is input to first J-K flipflop 52 which outputs the signal received from the amplifier 50 in inverted form as shown at F on the next occurring clock pulse rising edge. Second J-K flipflop 54 receives the output of the first J-K flipflop 52 and outputs that signal in inverted form as shown at E in FIG. 3 with a one clock cycle delay. The J-K flipflops 52 and 54 operate as a two bit shift register and delay the signal by one clock cycle as shown in FIG. 3. It will be understood that the state change of amplifier 50 sensed by digital differentiator circuit 51 can occur at any time within the clock cycle preceeding the rising edge clock pulse at which J-K 52 operates. The state change of amplifier 50 indicates that photoreceptor 11 has moved a preselected distance.

The inverted signal from J-K flipflop 52 and the non-inverted signal from J-K flipflop 54 are input to NAND gate 56 to produce a low going signal of one clock cycle duration as shown by the RESTART COUNTER signal D in FIG. 3. When the next leading edge of a rising clock pulse signal A occurs while the RESTART COUNTER signal D is low, the RESTART signal D goes high on the next clock pulse and results in the binary counter 64 reverting to state zero to begin the counting sequence at zero through $2^{N-1}$ as shown by signal B. When the highest state of the counter 64, state $2^{N-1}$ is reached, one output of the decoder 66, the TERMINAL COUNT STOP signal shown at C goes from low to high (as shown at the left hand portion of FIG. 3) at the same clock pulse and disables the clock signal A to the binary counter 64 to disable the counting sequence, thus maintaining the highest state, $2^{N-1}$, of the counter 64 until a subsequent low going signal from amplifier 50 is sensed by the digital differentiator circuit 51. When the binary counter 64 is in its counting sequence, timing signals M exit from decoder 66 to the control circuit of FIG. 6 to control loading of data information to shift registers 68 with data signals from image information source 70, 72. The timing signals M initiate the energization cycle in which the sourcing drivers 80 are enabled to selectively energize or excite individual diode groups within array 38. Further, when binary counter 64 is in its highest state $2^{N-1}$ and sequencing has stopped, the timing signals enabling energization of LED array 38 are also inhibited.

It will be understood that one energization cycle of a line of the LED array 38 takes place during a relatively short interval of time followed by a delay interval (binary counter 64 at state $2^{N-1}$) until the photoreceptor 11 has moved a predetermined distance. The function of the motion encoder 30 and digital differentiator 51 is to monitor the movement of the photoreceptor including the non-uniform motion and effectively to vary the delay interval between the LED energization cycles referred to above.

It should also be noted that clock pulse signal A determines the pulse rate of timing signals M and controls the initiation of the energization cycle of LED array 38. The clock frequency is selected to achieve optimum dot size and density consistent with a preselected photoreceptor speed. By energization cycle is meant both the timing for initiation of the energization of individual LED's as well as the duration of such energizations. The LED array 38 begins its energization cycle at state 0 of the binary counter 64 and terminates its cycle at state $2^{N-2}$. The interval between those states being fixed by the frequency of clock signal A. This frequency, as noted, is selected based on the desired dot size and density. Varying the delay interval between energization cycles of array 38, according to this invention, is accomplished without affecting the timing within or duration of the energization cycle of array 38. In this way, the delay interval between energization cycles is varied in accordance with photoreceptor 11 motion while the total duration and timing of the energization cycle for array 38 is maintained in order to achieve the desired predetermined dot size and density.

Figure 4:
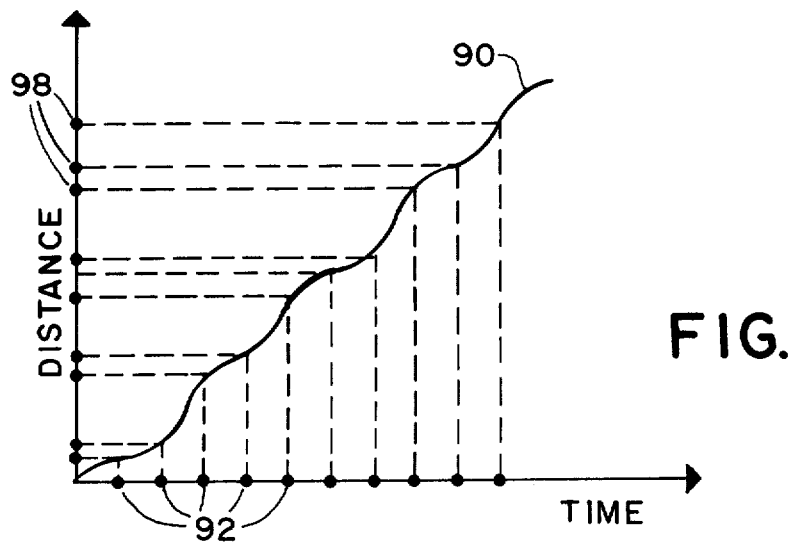
FIG. 4 is a graphic showing of the effect of typical uncompensated irregular motion of the photoreceptor.
Figure 5:
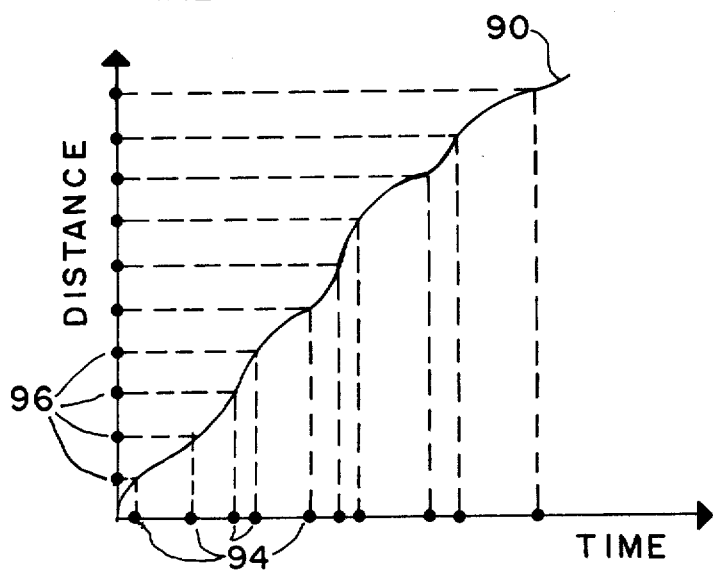
FIG. 5 is a graphic showing of the effect of compensation for non-uniform movement of the photoreceptor.

Referring now to FIGS. 4 and 5, the curve 90 represents the speed of the photoreceptor 11. In FIG. 4 there is graphically represented the dot printing intervals on the distance axis in the absence of non-uniform motion compensation according to this invention. As the diode array 38 is energized at regular intervals of time 92 on the time axis, the image dots 98 are placed on the photoreceptor 11 at irregular intervals as a result of non-uniform photoreceptor motion thus degrading image quality. In FIG. 5, the dot printing intervals 96 are represented graphically on the distance axis. When the timing of the energization of diode groups within array 38 is varied in response to a change in speed or non-uniform motion by the photoreceptor 11 as shown at selected points 94 on the time axis, the image dots 96 are located at regular evenly spaced intervals as shown on the distance axis thus insuring a high quality image even though the photoreceptor 11 motion is irregular or uneven.

It will be understood that the method and apparatus disclosed herein for compensating for erratic motion by an image receiving surface, although disclosed in an embodiment employing an LED array to discharge a charged photoconductive image receiving surface, is applicable to other forms of non-impact printers employing an image transferring device such as an ink jet head or a thermal print head for conveying an image from a data signal to a moving image receiving surface such as plain paper, or a heat sensitive paper, where the image receiving surface is subject to erratic non-uniform motion and the image transfer process is a function of the length of time in which the image conveying device is actuated, there being a delay interval between actuation cycles which is predetermined based on the desired image receiving surface speed.

In recapitulation, the method and apparatus of the present invention defines a non-impact printer of the electrophotographic type in which irregularly non-uniform motion of the photoreceptor is sensed and encoded for synchronization with the drive circuits for energizing selected diode groups of a light emitting diode array illumination assembly in order to compensate for such non-uniform motion to produce a high quality image.

It is, therefore, evident that there has been provided in accordance with the present invention a non-impact printing method and apparatus that fully satisfies the objects, aims and advantages set forth above. While this invention has been described in conjunction with specific embodiments thereof, it is evident that many alternatives, modifications and variations will be apparent to those skilled in the art. Accordingly, it is intended to embrace all such alternatives, modifications and variations that fall within the spirit and scope of the appended claims.

What is claimed is:

1. In a non-impact printer having a moving charged photoreceptor, an image information data signal source and a light emitting diode array operatively connected to the data signal source for selective energization of individual groups of diodes within the diode array in a cycle in response to the data signal received from the source, such cycle including a predetermined interval of diode energization followed by an interval of diode non-energization, the diode array being located in optical registration with the photoreceptor, the method of compensating for non-uniform photoreceptor motion comprising the steps of: monitoring the motion of the photoreceptor to generate a timing signal representative of the photoreceptor motion, and delaying input of the data signal to the diode array in response to variations in the timing signal by varying the duration of the interval of diode non-energization while maintaining the predetermined interval of diode energization, whereby energization of individual groups of the diode array is synchronized with motion of the photoreceptor.

2. The method as set forth in claim 1, wherein the monitoring step includes sensing a light beam interrupted by a rotable wheel having radial slots therein to generate a signal representative of the movement of the photoreceptor.

3. A non-impact printer comprising a moving photoreceptor having a charged photoconductive surface thereon, means for providing an image information containing data signal, means for selectively discharging localized areas of the photoreceptor to form a latent image thereon according to a predetermined timing cycle in response to the data signal, means for generating a timing signal representative of the motion of the photoreceptor and means for varying the time of input of the data signal to the discharging means in response to variations in the timing signal whereby actuation of the discharge cycle is synchronized with motion of the photoreceptor without changing the internal timing of the predetermined cycle.

4. A non-impact printer as set forth in claim 3 wherein the means for selectively discharging the photoreceptor includes a light emitting diode array.

5. A non-impact printer as set forth in claim 4 and further including shift register means for storing the data signals, a driver circuit for selectively energizing individual groups of diodes within the diode array, and means for generating a clock signal for timing the initiation and duration of diode energization according to the predetermined cycle, there being a delay interval between cycles predetermined according to the speed of the photoreceptor.

6. A non-impact printing as set forth in claim 5 wherein the means for varying the time of input of data signals to the diode array includes means for disconnecting the clock signal from the diode array to vary the delay interval.

7. A non-impact printer as set forth in claim 6 including sequencing means for enabling the driver circuit to energize the diode array under the control of the clock signal and wherein the disconnecting means includes a digital differentiator circuit which receives the signal representative of the photoreceptor motion and generates a signal which enables the sequencing means.

* * * * *